No. 611,875. Patented Oct. 4, 1898.
J. F. VORCK.
FUR TRIMMING FOR LADIES' HATS.
(Application filed Jan. 22, 1898.)

(No Model.)

WITNESSES:
William P. Gaebel.

INVENTOR
J. F. Vorck.
BY
ATTORNEYS.

THE NORRIS PETERS CO., PHOTO-LITHO., WASHINGTON, D. C.

UNITED STATES PATENT OFFICE.

JOHN FREDERICK VORCK, OF NEW YORK, N. Y.

FUR TRIMMING FOR LADIES' HATS.

SPECIFICATION forming part of Letters Patent No. 611,875, dated October 4, 1898.

Application filed January 22, 1898. Serial No. 667,593. (No model.)

*To all whom it may concern:*

Be it known that I, JOHN FREDERICK VORCK, of New York city, in the county and State of New York, have invented a new and Improved Fur Trimming for Ladies' Hats, of which the following is a full, clear, and exact description.

The object of the invention is to provide a new and improved fur trimming more especially designed for use on ladies' hats and constructed in imitation of feathers to give the hat an exceedingly-fine appearance.

The invention consists of novel features, as hereinafter more fully described.

Reference is to be had to the accompanying drawings, forming a part of this specification, in which similar characters of reference indicate corresponding parts in all the figures.

Figure 1:
Figure 2:
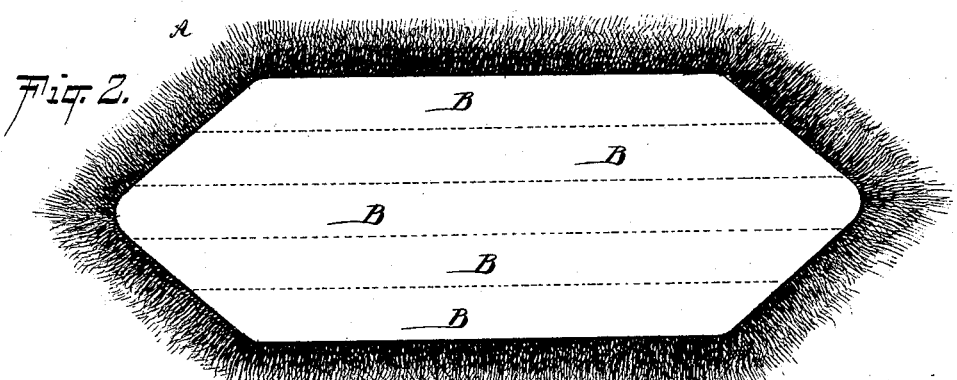
Figure 3:
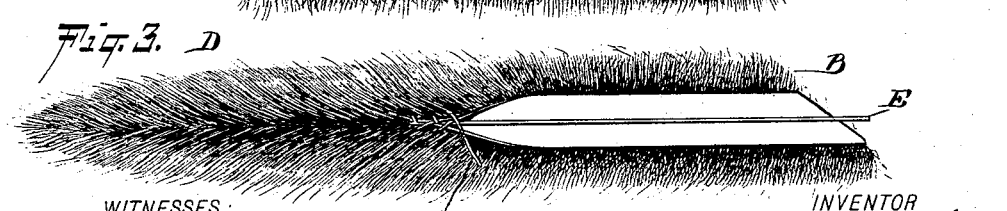

Figure 1 is a perspective view of the improvement as applied. Fig. 2 is a plan view of the fur skin, showing the manner in which the strips for producing the fur feathers are cut; and Fig. 3 is a plan view showing the formation of the fur feather.

In order to produce the trimming, the skin A is cut into longitudinal strips B, each of which has its side edges fastened together by stitches C, so as to produce a quill for a fur feather D, the fur extending in all directions from the skin of the strip B. Within the quill extends loosely a flexible core E, preferably of annealed wire, to permit of giving the fur feather the desired shape by correspondingly bending the quill with it, the core between the latter giving the desired stiffness after the desired shape is obtained, so as to maintain the shape of the feather at all times. After the quill is formed the ends of the feather are securely gripped by suitable devices, and the latter are turned in opposite directions so as to twist the quill to shorten the same and set the fur tight, thick, and solid and at the same time completely hide the sewed edge of the strip B.

In manufacturing the quill the strip is preferably moistened during the process of sewing it up, as before explained, and after the quill is formed I prefer to drop water into one end, so as to moisten it still more to permit of proper twisting and to maintain its form when dry.

In order to trim a hat with the fur feather, one or more may be employed, the several feathers being united at the outer ends of the core E and attached to a suitable base—in the shape of an animal's head, for instance—as illustrated in Fig. 1.

It will be seen that by the arrangement described the fur feathers extend from the base in the desired direction, the hairs standing in all directions, so as to give the trimming a very light appearance.

Having thus fully described my invention, I claim as new and desire to secure by Letters Patent—

A hat-trimming, comprising a series of fur feathers each consisting of a fur quill and a core for the same and a base to which the inner ends of the feathers are secured, substantially as shown and described.

JOHN FREDERICK VORCK.

Witnesses:
MAX H. CASPARI,
W. G. CRAIG.